United States Patent [19]

Amano et al.

[11] Patent Number: 5,650,476

[45] Date of Patent: Jul. 22, 1997

[54] PROCESS FOR PRODUCTION OF POLYCARBODIIMIDE RESIN POWDER

[75] Inventors: Satoshi Amano; Tomoki Nakamura; Takahiko Ito; Hideshi Tomita; Norimasa Nakamura, all of Tokyo, Japan

[73] Assignee: Nisshinbo Industries, Inc., Tokyo, Japan

[21] Appl. No.: 541,157

[22] Filed: Oct. 11, 1995

[30] Foreign Application Priority Data

Nov. 14, 1994 [JP] Japan ................................. 6-305413

[51] Int. Cl.⁶ .................................................. C08G 18/02
[52] U.S. Cl. ................................ 528/44; 264/5; 564/252
[58] Field of Search .............................. 528/44; 264/5; 564/252

[56] References Cited

U.S. PATENT DOCUMENTS 3,929,733  12/1975  Alberino et al. ............................ 528/51
5,416,184   5/1995  Amano et al. .............................. 528/44

*Primary Examiner*—Rachel Gorr
*Attorney, Agent, or Firm*—Kubovcik & Kubovcik

[57] ABSTRACT

A process for producing a polycarbodiimide resin powder, which includes reacting an organic diisocyanate in the presence of a carbodiimidization catalyst in a solvent to produce a polycarbodiimide resin and obtaining the resin in a powder form, where the organic diisocyanate is represented by the following formula

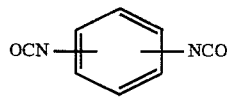

or

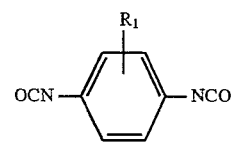

where $R_1$ is a lower alkyl group or a lower alkoxyl group, or

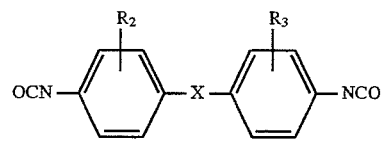

where $R_2$ and $R_3$ are independently a hydrogen atom, a lower alkyl group or a lower alkoxyl group, and X is an oxygen atom or a methylene group, or

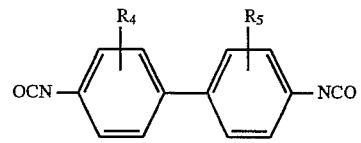

where $R_4$ and $R_5$ are independently a hydrogen atom, a lower alkyl group or a lower alkoxyl group; the solvent is a mixed solvent of a good solvent to polycarbodiimide resin and a poor solvent to the resin, having a precipitation number of 30–80; and when the reaction has reached a certain stage, the reaction system is cooled to make the system a slurry of a polycarbodiimide, and then the polycarbodiimide is obtained in a powder form.

8 Claims, No Drawings

PROCESS FOR PRODUCTION OF POLYCARBODIIMIDE RESIN POWDER

BACKGROUND OF THE INVENTION

(1) Field of the Invention

The present invention relates to a process for production of polycarbodiimide resin powder. More particularly, the present invention relates to a process for producing a polycarbodiimide resin powder simply in industry by cooling the reaction system when the system has reached a certain polymerization stage, to make the system a slurry.

(2) Description of the Prior Art

Polycarbodiimide resins are polymer compounds each having recurring units represented by —N=C=N—R—. Being superior in heat resistance, etc., they have been used in various applications such as molding material, resin modifier, adhesive and the like.

In general, polycarbodiimide resins, particularly aromatic polycarbodiimide resins which are excellent in heat resistance and chemical resistance, however, are sparingly soluble in various solvents and, when it is intended to produce them so as to have a high molecular weight, the reaction system becomes a gel, making it difficult to produce them in a powder form. The conventional techniques for producing a polycarbodiimide resin in a powder form include, for example, the followings.

T. W. Campbell et al., J. Org. Chem., 28, 2069 (1963)

C. S. Fold et al., Macromol. Syn., 1, 74 (1963)

T. W. Campbell et al., Macromol. Syn., 3, 109 (1969)

In these techniques, a polycarbodiimide resin powder is produced by using a single or mixed solvent capable of dissolving a raw material diisocyanate but incapable of dissolving a polycarbodiimide produced.

The polycarbodiimide resin powder obtained as a precipitate in the above technique, however, has a relatively low molecular weight and contains a large number of residual isocyanate groups. Therefore, when the resin powder is heated at temperatures of 180° C. or higher, it melts and causes recarbodiimidization (which is decarboxylation), giving rise to foaming and swelling. This becomes a problem when the resin powder is used, for example, as a molding material or a modifier.

There was also mentioned about production of a polycarbodiimide resin powder of relatively high molecular weight in the above literature. In this study, gelation takes place in the course of the reaction, and the gel is ground in a poor solvent and subjected to solvent removal to produce a powder. This process is usable in a laboratory but is not practical because the steps for gel grinding and solvent removal must be employed and the poor solvent must be used in an excess amount relative to the gel, making the process inefficient.

In order to improve these problems, J. Appl. Polym. Sci., 21, 1999 (1977), Japanese Patent Publication No. 16759/1977, Japanese Patent Application Kokai (Laid-Open) No. 39223/1993, etc. disclose processes for reacting 4,4'-diphenylmethane diisocyanate and an organic monoisocyanate as a molecular weight-controlling agent in an inert organic solvent in the presence of a carbodiimidization catalyst to isolate a polycarbodiimide in a powder form.

In the process of J. Appl. Polym. Sci., 21, 1999 (1977), the above reaction is conducted in a xylene solvent; after the completion of the reaction, the reaction system is cooled to room temperature and the resulting solid precipitate is isolated by filtration; the filtrate is poured into an excess amount of hexane and the resulting solid precipitate is isolated by filtration; and the two precipitates are combined and dried to obtain a powder. In the literature, the powder is called a terminal-blocked polycarbodiimide and the properties are described.

The process of Japanese Patent Publication No. 16759/1977 is the same as that of the above literature except that a mixed solvent of benzene and hexane is used as a polymerization solvent as seen in Example 1.

In the process of Japanese Patent Application Kokai (Laid-Open) No. 239223/1993, the above-mentioned carbodiimidization is conducted using a halogen type solvent as a polymerization solvent to obtain a uniform polycarbodiimide resin solution; the solution is cooled and made into a slurry; the slurry is spray-dried to obtain a powder of narrow particle size distribution.

The features of these techniques are to (1) prevent gelation by the use of a terminal-blocking agent and resultant molecular weight control and (2) appropriately control the solubility of polycarbodiimide resin in solvent to precipitate a solid and powderize it.

In the thus-produced terminal-blocked polycarbodiimide resin powders, however, the terminal-blocking agents used react with each other because they are organic monoisocyanates, and produce monocarbodiimides and low-molecular weight polycarbodiimides. These products cause decomposition and gasification depending upon the application of the polycarbodiimide resin powder, inviting foaming, swelling, offensive odor, etc.

When the above polycarbodiimide powders are used in a medium such as oil, the low-molecular weight polymer portion of the powders may dissolve into the medium and may denaturate the medium. Moreover, organic monoisocyanates which are used ordinary are expensive and their use incurs an increased cost.

SUMMARY OF THE INVENTION

The object of the present invention is to provide a process which is free from the above-mentioned problems of the prior art and which can produce a polycarbodiimide resin powder of relatively high molecular weight simply and without using a terminal-blocking agent.

According to the present invention, there is provided a process for producing a polycarbodiimide resin powder, which comprises reacting an organic diisocyanate in the presence of a carbodiimidization catalyst in a solvent to produce a polycarbodiimide resin and obtaining said resin in a powder form, wherein the organic diisocyanate is a compound represented by the following formula

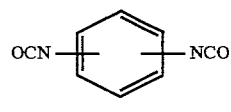

or

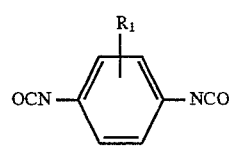

(wherein $R_1$ is a lower alkyl group or a lower alkoxyl group), or

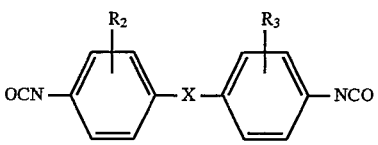

(wherein $R_2$ and $R_3$ are independently a hydrogen atom, a lower alkyl group or a lower alkoxyl group, and X is an oxygen atom or a methylene group), or

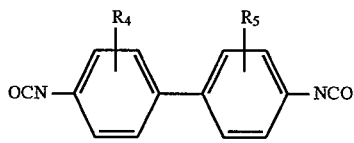

(wherein $R_4$ and $R_5$ are independently a hydrogen atom, a lower alkyl group or a lower alkoxyl group); the solvent is a mixed solvent of a good solvent to polycarbodiimide resin and a poor solvent to said resin, having a precipitation number of 30–80; and when the reaction has reached a certain stage, the reaction system is cooled to make the system a slurry of a polycarbodiimide, and then the polycarbodiimide is obtained in a powder form.

DETAILED DESCRIPTION OF THE INVENTION

The present invention is hereinafter described in detail.

The organic diisocyanate used in the present invention is represented by the above-shown formula and, when made into a polycarbodiimide, is crystalline. Specific examples of the organic diisocyanate are 4,4'-diphenylmethane diisocyanate, 4,4'-diphenylether diisocyanate, p-phenylene diisocyanate, 3,3'-dimet hoxy-4,4'-biphenyl diisocyanate and o-tolidine diisocyanate.

In the present invention, the above organic diisocyanate may be used in combination with other organic diisocyanate. A particularly preferable example of the other organic diisocyanate combined with, for example, 4,4'-diphenylmethane diisocyanate is tolylene diisocyanate.

The carbodiimidization catalyst used in the present invention may be any known carbodiimidization catalyst such as 3-methyl-1-phenyl-2-phospholene-1-oxide, 3-methyl-1-phenyl-3-phosp holene-1-oxide, 3-methyl-1-ethyl-2-phospholene-1-oxide or the like. Of these, 3-methyl-1-phenyl-2-phospholene-1-oxide is preferred in view of the reactivity.

In the present invention, the synthesis of polycarbodiimide resin in the presence of said carbodiimidization catalyst must be conducted in a mixed solvent of a good solvent to said polycarbodiimide resin and a poor solvent to said resin, having a precipitation number of 30–80.

The good solvent used in the present invention is preferably an alicyclic ether which is liquid at room temperature. It includes, for example, tetrahydrofuran, dioxane, tetrahydropyran and dioxolane. Of these, tetrahydrofuran is preferred in order to obtain a polycarbodiimide of high molecular weight.

The poor solvent must have a precipitation number of 30–80, preferably 40–60. The concept "precipitation number" used in the present invention is defined as follows.

Precipitation Number

An organic diisocyanate, i.e. 4,4'-diphenylmethane diisocyanate is reacted at an initial monomer concentration of 15% by weight in tetrahydrofuran; to 100 ml of the resulting solution of a polycarbodiimide resin having a molecular weight of 7,000 to 9,000 is added a poor solvent slowly and continuously at 25°±2° C. with stirring; during the addition, a precipitate is formed and then redissolves at the early stage of the addition, but at a certain timing the once-formed precipitate shows no redissolution; the amount (ml) of the poor solvent added until no redissolution takes place, is taken as the precipitation number of the poor solvent.

Specific examples of the poor solvent having a precipitation number of 30–80 are alicyclic hydrocarbons such as cyclohexane, cyclopentane, decahydronaphthalene and the like; esters such as methyl acetate, ethyl acetate, ethyl acetoacetate, butyl acetate, methyl lactate, ethyl lactate, isopropyl lactate, ethylene glycol diacetate and the like; ethers such as diethyl ether, dibutyl ether, isopropyl ether and the like; ether esters such as propylene glycol methyl ether acetate and the like; and ketones such as acetone, methyl ethyl ketone, diethyl ketone, methyl propyl ketone, methyl isobutyl ketone, methyl isopropyl ketone and the like. These poor solvents may be used in admixture of two or more.

Hexane, pentane, etc. generally known as poor solvents to polycarbodiimide have precipitation numbers of less than 30. When these poor solvents are used in the present invention, the reaction system causes separation into two-phase or precipitation in the course of the reaction, making it impossible to obtain an intended product.

When there is used a poor solvent having a precipitation number of more than 80, such as benzene, toluene, methylene chloride, chloroform, chlorobenzene, dimethylacetamide or the like, the reaction system becomes a gel, making it impossible to obtain an intended product.

The volume ratio of the good solvent and the poor solvent is (volume of good solvent)/(volume of poor solvent)$\leq$150/(precipitation number), preferably (volume of good solvent)/(volume of poor solvent)$\leq$100/(precipitation number).

In the process of the present invention, the initial concentration of raw material (organic diisocyanate monomer) is, for example, 40% by weight or less, preferably 15–35% by weight.

In the present process, the reaction temperature is determined by the kind of the mixed solvent. When the mixed solvent is an azeotropic mixture, the reaction temperature is the azeotropic temperature of the mixture. When the good solvent and poor solvent of the mixed solvent have different boiling points, the reaction temperature is taken between the two boiling points. The reaction time is determined by the reaction temperature but is about several hours to ten and odd hours.

For example, when the initial monomer concentration is 35% by weight and the mixed solvent is tetrahdyrofuran/ethyl acetate=1.2/1 (volume ratio), the reaction temperature is 70° C. and the reaction time is 3 hours. When the initial monomer concentration is 20% by weight and the mixed solvent is tetrahydrofuran/acetone=1.5/1 (volume ratio), the reaction temperature is 60° C. and the reaction time is 5 hours.

In conventional techniques, when a reaction is conducted in a homogeneous system in order to obtain a polycarbodiimide of high molecular weight, gelation takes place or a polycarbodiimide resin is precipitated before said resin has an intended molecular weight, whereby polymerization stops. In contrast, in the present invention, no gelation takes place and a polycarbodiimide resin of high molecular weight can be produced at a high concentration. For example, it is possible to produce a polycarbodiimide resin having a styrene-reduced number-average molecular weight of 7,000 or more as measured by gel permeation chromatography (GPC).

As mentioned above, in the present invention, a polycarbodiimide resin of high molecular weight can be produced at a high concentration without inviting gelation. The reason is not clear but is presumed to be as follows. When in the course of polymerization the molecular weight of the polycarbodiimide being produced has reached a certain level, the local concentration of polycarbodiimide in good solvent becomes high; as a result, two-phase system, i.e. polymer-rich phase and polymer-poor phase are formed; the former will become microgels or similar aggregations (this situation is called as "microscopic phase separation" in this specification). When the polymerization is allowed to proceed further in this state, a polycarbodiimide resin of high molecular weight can be produced at a high concentration without inviting gelation.

When the reaction system is further heated, the above-mentioned state such as microscopic phase separation, microgel or the like changes to a macroscopic state and causes gelation. In the present invention, however, the reaction system is cooled before the system changes to a macroscopic state, whereby agglomeration and crystallization are allowed to proceed in a microscopic state, making it possible to form a slurry and obtain a powder from the slurry. In the cooling, the temperature employed is room temperature or lower, preferably 10° C. or lower and stirring must be continued until the slurry is formed. In this case, the particle diameters of the polycarbodiimide resin powder obtained can be controlled to some extent by appropriate selection of the cooling rate, the stirring condition, etc.

The timing of start of the cooling can be determined as follows. At the early stage of the change of the state such as microscopic phase separation, microgel or the like to a macroscopic state, particles having diameters visible to naked eyes appear and the reaction system gets cloudy; at this timing, the cooling can be started. Or, samples are periodically taken from the reaction system; each sample is measured for molecular weight by GPC; when the sample has a desired molecular weight, for example, 3,000 or more, preferably 4,500 or more in terms of number-average molecular weight, the cooling can be started. Incidentally, when the number-average molecular weight is smaller than 3,000, foaming or swelling occurs as mentioned earlier, and such a molecular weight is not preferred.

The timing of start of the cooling can also be determined, for example, by NCO % or the ratio of the transmittances of isocyanate group and carbodiimide group in IR spectrum. When NCO % is used, the cooling is started when the NCO % becomes 3 or less, preferably 2.5 or less. When the ratio of said transmittances is used, the cooling is started when the ratio becomes 4 or more, preferably 5 or more.

In producing a polycarbodiimide resin powder from the polycarbodiimide resin slurry, there can be used a known method such as filtration, drying or spray drying. It can be easily anticipated that the present process can produce even a terminal-blocked polycarbodiimide resin powder.

When the good solvent and the poor solvent are selected so as to have boiling points close to each other, the mixed solvent thereof can be recovered from the slurry of polycarbodiimide resin and the recovered mixed solvent can be reused as it is. A combination of such solvents includes, for example, tetrahydrofuran (good solvent) and ethyl acetate (poor solvent).

The present invention is hereinafter described in more detail by way of Examples.

EXAMPLE 1

(Preparation of slurry)

There was prepared, as a reactor, a 3-liter four-necked flask equipped with a Dimroth condenser, a thermometer and a mechanical stirrer. 600 ml of tetrahydrofuran and 500 ml of ethyl acetate were separately fed into the reactor from the raw material inlet. Then, 530 g of 4,4'-diphenyl methane diisocyanate (hereinafter abbreviated to MDI) was added as a raw material. The mixture was heated with stirring. When the system inside became 50° C., 0.2% by weight, based on the raw material, of 3-methyl-1-phenyl-2-phospholene-1-oxide was added, after which a reaction was conducted under refluxing for about 2.5 hours. At this timing, the polycarbodiimide produced was measured for molecular weight by GPC, which was 5,300 in terms of number-average molecular weight. Then, the reaction system was cooled and the temperature inside the reaction system was lowered to 5° C. in 1 hour and kept at that level for 5 hours. About when the temperature inside the reaction system became 20° C., the system got cloudy, and finally a slurry was formed. The polycarbodiimide resin right after slurry formation had a number-average molecular weight of 7,000.

(Production of powder)

The above-obtained slurry was subjected to vacuum filtration using a Nutsche to obtain a wet cake. The wet cake was lightly ground in a mortar and dried at 70° C. for 5 hours by the use of a vacuum drier to obtain a white powder.

EXAMPLE 2

(Preparation of slurry)

Into the same reactor as used in Example 1 were separately fed 600 ml of tetrahydrofuran and 660 ml of ethyl acetate from the raw material inlet. Then, 610 g of MDI was added. The mixture was heated with stirring. When the system inside became 50° C., 0.2% by weight, based on MDI, of 3-methyl-1-phenyl-2-phosp holene-1-oxide was added, after which a reaction was conducted under refluxing for about 2.8 hours. Since the reaction system got slightly cloudy, the system was cooled in the same manner as in Example 1. With the proceeding of the cooling, the system inside became transparent once and got cloudy again from at about 20° C. as in Example 1, and finally a slurry was formed. The polycarbodiimide resin right after slurry formation had a number-average molecular weight of 9,800.

(Production of powder)

The above-obtained slurry was subjected to spray drying at 100° C. in a spray drier to obtain a white powder.

EXAMPLE 3

Into the same reactor as used in Example 1 were separately fed 600 ml of tetrahydrofuran and 500 ml of ethyl acetate from the raw material inlet. Then, 170 g of MDI was added. The mixture was heated with stirring. When the system inside became 50° C., 0.2% by weight, based on MDI, of 3-methyl-1-phenyl-2-phosp holene-1-oxide was added, after which a reaction was conducted under refluxing for about 6 hours. At this timing, the polycarbodiimide resin produced was measured for molecular weight by GPC, which was 5,800 in terms of number-average molecular weight. Then, the reaction system was cooled in the same manner as in Example 1. With the proceeding of the cooling, the system inside changed in the same manner as in Example 1, and finally a slurry was formed. The polycarbodiimide resin right after slurry formation had a number-average molecular weight of 7,800. Powderization was conducted in the same manner as in Example 1 to obtain a white powder.

EXAMPLE 4

Into the same reactor as used in Example 1 were separately fed 1000 ml of tetrahydrofuran and 400 ml of cyclohexane from the raw material inlet. Then, 510 g of MDI was added. The mixture was heated with stirring. When the system inside became 50° C., 0.2% by weight, based on MDI, of 3-methyl-1-phenyl-2-phosp holene-1-oxide was added, after which a reaction was conducted under refluxing for about 3 hours. At this timing, the polycarbodiimide resin produced was measured for molecular weight by GPC, which was 5,100 in terms of number-average molecular weight. Then, the reaction system was cooled in the same manner as in Example 1. With the proceeding of the cooling, the system inside changed in the same manner as in Example 1, and finally a slurry was formed. The polycarbodiimide resin right after slurry formation had a number-average molecular weight of 7,000. Powderization was conducted in the same manner as in Example 1 to obtain a white powder.

EXAMPLE 5

Into the same reactor as used in Example 1 were separately fed 900 ml of tetrahydrofuran and 300 ml of diisopropyl ether from the raw material inlet. Then, 440 g of MDI was added. The mixture was heated with stirring. When the system inside became 50° C., 0.2% by weight, based on MDI, of 3-methyl-i-phenyl-2-phospholene-1-oxide was added, after which a reaction was conducted under refluxing for about 3 hours. At this timing, the polycarbodiimide resin produced was measured for molecular weight by GPC, which was 5,200 in terms of number-average molecular weight. Then, the reaction system was cooled in the same manner as in Example 1. With the proceeding of the cooling, the system inside changed in the same manner as in Example 1, and finally a slurry was formed. The polycarbodiimide resin right after slurry formation had a number-average molecular weight of 7,100. Powderization was conducted in the same manner as in Example 1 to obtain a white powder.

EXAMPLE 6

Into the same reactor as used in Example 1 were separately fed 600 ml of tetrahydrofuran and 500 ml of ethyl acetate from the raw material inlet. Then, 330 g of o-tolidine diisocyanate (TODI) was added. The mixture was heated with stirring. When the system inside became 50° C., 0.2% by weight, based on TODI, of 3-methyl-1-phenyl-2-phospholene-1-oxide was added, after which a reaction was conducted under refluxing for about 5 hours. At this timing, the polycarbodiimide resin produced was measured for molecular weight by GPC, which was 4,500 in terms of number-average molecular weight. Then, the reaction system was cooled in the same manner as in Example 1. With the proceeding of the cooling, the system inside changed in the same manner as in Example 1, and finally a slurry was formed. The polycarbodiimide resin right after slurry formation had a number-average molecular weight of 6,100.

COMPARABLE EXAMPLE 1

Into the same reactor as used in Example 1 was fed 1,000 ml of tetrahydrofuran from the raw material inlet. Then, 450 g of MDI was added. The mixture was heated with stirring. When the system inside became 50° C., 0.2% by weight, based on MDI, of 3-methyl-1-phenyl-2-phospholene-1-oxide was added, after which a reaction was conducted under refluxing for about 3 hours. At this timing, the system inside became a gel and no slurry could be obtained.

The gel was fed into a mixer together with 2 liters of hexane, followed by stirring. The resulting material was filtered; and the residue (unfiltered material) was washed with hexane, subjected to vacuum drying at 70° C. for 5 hours to obtain fibrous lumps.

COMPARABLE EXAMPLE 2

Into the same reactor as used in Example 1 was fed 1,000 ml of ethyl acetate from the raw material inlet. Then, 480 g of MDI was added. The mixture was heated with stirring. When the system inside became 50° C., 0.2% by weight, based on MDI, of 3-methyl-1-phenyl-2-phospholene-1-oxide was added, after which a reaction was conducted under refluxing for about 30 minutes. At this timing, lumps were formed inside the system and no slurry could be obtained.

The lumps were separated by filtration, subjected to vacuum drying at 70° C. for 5 hours, and ground by the use of a grinder to obtain a powder.

COMPARABLE EXAMPLE 3

Into the same reactor as used in Example 1 were separately fed 600 ml of tetrahydrofuran and 500 ml of hexane from the raw material inlet. Then, 460 g of MDI was added. The mixture was heated with stirring. When the system inside became 50 ° C., 0.2% by weight, based on MDI, of 3-methyl-1-phenyl-2-phospho lene-1-oxide was added, after which a reaction was conducted under refluxing for about 50 minutes. At this timing, separation into two-phase took place, after which lumps of polycarbodiimide resin were formed. Thus, no slurry could be obtained. The lumps were subjected to the same procedure as in Comparative Example 2 to obtain a powder.

COMPARABLE EXAMPLE 4

Into the same reactor as used in Example 1 were separately fed 600 ml of tetrahydrofuran and 500 ml of toluene from the raw material inlet. Then, 520 g of MDI was added. The mixture was heated with stirring. When the system inside became 50 ° C., 0.2% by weight, based on MDI, of 3-methyl-1-phenyl-2-phospho lene-1-oxide was added, after which a reaction was conducted under refluxing for about 1.5 hours. At this timing, gelation occurred inside the reaction system and no slurry could be obtained. The gel was subjected to the same procedure as in Comparative Example 1 to obtain a powder.

COMPARABLE EXAMPLE 5

Into the same reactor as used in Example 1 were separately fed 1,000 ml of benzene and 190 ml of hexane from the raw material inlet. Then, 360 g of MDI and 34.3 g of phenyl isocyanate were added. The mixture was heated with stirring. When the system inside became 50° C., 0.2% by weight, based on the raw material isocyanates, of 3-methyl-1-phenyl-2-phospholene-1-oxide was added. Thereafter, a reaction was conducted at 70° C. for 3 hours and a theoretical amount of carbon dioxide was collected. The reaction system in which precipitation had started, was allowed to stand as it was, for 16 hours. The system which was cloudy owing to the formation of precipitate, was cooled to room temperature (about 20° C.); then the precipitate was collected by filtration; the filtrate was poured into an excess amount of hexane to form a precipitate; this precipitate was collected by filtration. The two precipitates were combined and dried in the air overnight and then in vacuum at 80° C. for 4 hours to obtain a terminal-blocked polycarbodiimide resin powder having an average polymerization degree of n=10.

Reference Test

The polycarbodiimide resin powders obtained in Examples 1–6 and Comparative Examples 1–5 were measured for thermal properties as follows.

Weight Reduction (%) by Thermal Gravimetry (TG)
Measurement conditions:
 Temperature elevation rate: 20° C./min
 Final temperature: 800° C.
Evaluation:
 weight reduction (%) at 300° C. determined from the TG curve obtained
Thermal behavior of film formed
Film-forming conditions:
 Sample amount: 2 g
 Temperature: 160° C.
 Time: 10 min
 Total pressure: 1,000 kg
Evaluation:
 A film formed under the above conditions was placed on a plate of 260° C. for 10 minutes, and appearance of foaming was examined visually.

The results of the above measurements for thermal properties are shown in Table 1.

TABLE 1

| Sample | Slurry formation | Weight reduction at 300° C. (%) | Film Foaming |
|---|---|---|---|
| Example 1 | O | 0.5 | No |
| Example 2 | O | 0.7 | No |
| Example 3 | O | 0.4 | No |
| Example 5 | O | 0.5 | No |
| Example 6 | O | 0.4 | No |
| Comparative Example 1 | X | 2.1 | No |
| Comparative Example 2 | X | 5.3 | Yes |
| Comparative Example 3 | X | 4.9 | Yes |
| Comparative Example 4 | X | 2.5 | Yes |
| Comparative Example 5 | X | 1.2 | Yes |

The present process for producing a polycarbodiimide resin powder comprises reacting an organic diisocyanate in the presence of a carbodiimidization catalyst in a solvent to produce a polycarbodiimide resin and obtaining said resin in a powder form, wherein the organic diisocyanate is such as being crystalline when made into a polycarbodiimide resin; the solvent is a mixed solvent of a good solvent to polycarbodiimide resin and a poor solvent to said resin, having a precipitation number of 30–80; and when the reaction has reached a certain stage, the reaction system is cooled to make the system a slurry of a polycarbodiimide, and then the polycarbodiimide is obtained in a powder form. The process can produce a polycarbodiimide resin powder of relatively high molecular weight simply using no terminal-blocking agent.

The polycarbodiimide resin powder obtained by the present process is superior in that the weight reduction at high temperatures is very small and that the film formed therefrom gives no foaming when heated.

What is claimed is:

1. A process for producing a polycarbodiimide resin powder, which comprises reacting an organic diisocyanate in the presence of a carbodiimidization catalyst in a solvent to produce a polycarbodiimide resin and obtaining said resin in a powder form, wherein the organic diisocyanate is a compound represented by the following formula

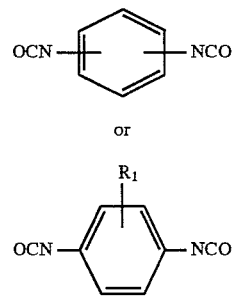

or

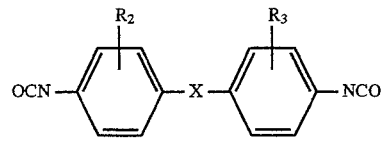

(wherein $R_1$ is a lower alkyl group or a lower alkoxyl group), or

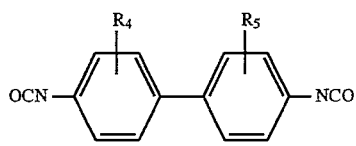

(wherein $R_2$ and R3 are independently a hydrogen atom, a lower alkyl group or a lower alkoxyl group, and X is an oxygen atom or methylene group), or (wherein $R_4$ and $R_5$ are independently a hydrogen atom, a lower alkyl group or a lower alkoxyl group); the solvent is a mixed solvent of a good solvent to polycarbodiimide resin and a poor solvent to said resin, having a precipitation number of 30–80; and when the reaction has reached a certain stage, the reaction system is cooled to make the system a slurry of a polycarbodiimide, and then the polycarbodiimide is obtained in a powder form.

2. A process according to claim 1, wherein the good solvent to polycarbodiimide resin is an alicyclic ether.

3. A process according to claim 2, wherein the good solvent to polycarbodiimide resin is tetrahydrofuran.

4. A process according to claim 1, wherein the mixing ratio of the good solvent and the poor solvent in the mixed solvent is (volume of good solvent)/(volume of poor solvent)≦150/(precipitation number).

5. A process according to claim 1, wherein the reaction is conducted at a monomer (organic diisocyanate) concentration of 40% by weight or less.

6. A process according to claim 1, wherein the good solvent and the poor solvent are each selected so as to have a boiling point close to that of each other and the mixed solvent thereof is recovered from the slurry of a polycarbodiimide resin.

7. A process according to claim 6, wherein the good solvent is tetrahydrofuran and the poor solvent is ethyl acetate.

8. A process according to claim 1, wherein the cooling is started when the molecular weight of the polycarbodiimide resin being produced has reached a desired level.

* * * * *